(12) United States Patent
Mugnier et al.

(10) Patent No.: US 7,658,896 B2
(45) Date of Patent: Feb. 9, 2010

(54) METHOD FOR ATTACKING BAUXITE ENHANCING FILTERABILITY OF SLUDGE IN ATTACK OUTPUT

(75) Inventors: Nicolas Mugnier, Queensland (AU); Patrick Leizour, Aix en Provence (FR)

(73) Assignee: Pechiney Rhenalu, Paris (FR)

( * ) Notice: Subject to any disclaimer, the term of this patent is extended or adjusted under 35 U.S.C. 154(b) by 589 days.

(21) Appl. No.: 10/530,352

(22) PCT Filed: Oct. 21, 2003

(86) PCT No.: PCT/FR03/03104

§ 371 (c)(1),
(2), (4) Date: Jun. 8, 2005

(87) PCT Pub. No.: WO2004/039729

PCT Pub. Date: May 13, 2004

(65) Prior Publication Data

US 2006/0051268 A1    Mar. 9, 2006

(30) Foreign Application Priority Data

Oct. 25, 2002    (FR) ................................... 02 13408

(51) Int. Cl.
*C01F 7/14*    (2006.01)
(52) U.S. Cl. ...................................... 423/121; 423/625
(58) Field of Classification Search .................. 423/121, 423/625
See application file for complete search history.

(56) References Cited

U.S. PATENT DOCUMENTS

| | | | |
|---|---|---|---|
| 4,446,117 A * | 5/1984 | McDaniel | 423/121 |
| 4,511,542 A | 4/1985 | Anjier et al. | |
| 5,545,384 A * | 8/1996 | Harato et al. | 423/121 |
| 5,653,947 A * | 8/1997 | Lamerant | 423/121 |
| 5,869,020 A * | 2/1999 | Rijkeboer et al. | 423/629 |
| 6,296,818 B2 * | 10/2001 | Lamerant | 423/121 |
| 6,391,277 B1 | 5/2002 | El Kadi et al. | |
| 2001/0028870 A1 * | 10/2001 | Takenaka et al. | 423/121 |
| 2005/0123460 A1 * | 6/2005 | Keramidas et al. | 423/121 |

FOREIGN PATENT DOCUMENTS

| | | |
|---|---|---|
| WO | 99/30794 | 6/1999 |
| WO | 99/61129 | 12/1999 |

* cited by examiner

*Primary Examiner*—Stanley Silverman
*Assistant Examiner*—James Fiorito
(74) *Attorney, Agent, or Firm*—Dennison, Schulrz & MacDonald

(57) ABSTRACT

Process for the treatment of bauxite (10) by alkaline digestion, typically using the Bayer process in order to obtain alumina hydrate, characterized in that ground bauxite (11, 15) is added directly into an alkaline solution (21a) that is drawn off and that will be reinserted into the Bayer aluminate liquor circuit (20), the said alkaline solution (21a) being heated at a temperature such that after the said ground bauxite (11, 15) and the said alkaline solution have been brought into contact, the temperature of the slurry resulting from this mix is greater than a temperature close to the boiling temperature at atmospheric pressure, in other words typically greater than 95° C. and preferably greater than or equal to the boiling temperature at atmospheric pressure.

8 Claims, 5 Drawing Sheets

METHOD FOR ATTACKING BAUXITE ENHANCING FILTERABILITY OF SLUDGE IN ATTACK OUTPUT

This application is a filing under 35 USC 371 of PCT/FR2003/003104 filed Oct. 21, 2003.

FIELD OF THE INVENTION

The invention relates to the treatment of bauxites by alkaline digestion, typically using the Bayer process in order to obtain alumina hydrate. More particularly, it relates to the treatment of bauxites containing mainly alumina in the form of gibbsite or mixed bauxites containing alumina trihydrate such as gibbsite and alumina monohydrate such as boehmite.

DESCRIPTION OF RELATED ART

The Bayer process, extensively described in the specialised literature, forms the main technique for the production of alumina to be transformed into aluminium by igneous electrolysis. According to this process, the bauxite ore is treated hot using an aqueous solution of sodium hydroxide with an appropriate concentration thus causing solubilisation of a supersaturated solution of sodium aluminate. After separation of the solid phase that makes up the undigested residue (red mud) of the ore, the supersaturated solution of sodium aluminate is seeded with particles of alumina trihydrate in order to cause precipitation of alumina trihydrate. The sodium aluminate liquor, once depleted in alumina after the precipitation phase of alumina trihydrate, is recycled to digest the bauxite, possibly after being concentrated and/or recharged with sodium hydroxide to form a liquor with an appropriate caustic concentration for the said digestion.

The rate at which separation takes place between insoluble residues and the pregnant liquor is of vital importance because it determines the efficiency and productivity of the process.

In the early stages of the alumina industry, insoluble residues were separated by filtration on a press filter. Although this technique is still mentioned in most patents dealing with the treatment of red mud, it is only used in exceptional cases and has been replaced by sedimentation made using continuous operation settlement tanks. Separation of insoluble residues by settlement provides a means of continuously processing large flows with low operating costs.

Filtration is sometimes used after bauxites with a high content of aluminium hydrate have been digested. It is frequently used after settling (safety filtration). Kelly type filters are used in both cases, and are designed to be fitted on tanks inside which mobile metal frames are installed as supports for filtering surfaces.

Many attempts have been made to separate mud on rotary filters, either under a vacuum or under pressure. Rotary filters have the advantage that they operate continuously; they retain solid parts and are regularly cleaned by the application of a differential pressure on the two walls of the filter. Unfortunately, these attempts were not successful due to the high impermeability of red mud cakes, that quickly reduces the flow and makes washing very difficult. Filterability is further aggravated when a desilication treatment is performed before digestion of gibbsite bauxites with a low silica content, in other words bauxites containing less than 2.5% of reactive silica. Reactive silica is a silica in the form of alumina silicate or any other easily soluble form in a sodium aluminate liquor like that used in the Bayer process. A document like FR2 732 332 describes this particular step of the Bayer process that is called "predesilicatation", in which the ground bauxite is desilicated before it is digested by the aluminate liquor.

In particular, patents EP 1 051 227, EP 1 089 797, WO93/06046 and EP 0 616 882 describe processes in which flocculent type additives are poured into the digestion slurry to increase the rate at which the liquid/solid separation takes place. These types of techniques are suitable for accelerating separation by settling but are not very efficient in improving the filterability of slurries.

U.S. Pat. Nos. 5,716,530 and 4,446,117 describe processes describing the use of sand filters in the presence of additives such as biopolymers (biocarbohydrates such as dextran) or sand filters fitted with synthetic fabrics. But these documents describe a step at a different stage in the Bayer cycle, in fact the security filtration carried out after settlement on the overflow from settlement tanks, in other words on the clear liquors containing a very low quantity of fine particles in suspension. This type of technique cannot be applied to liquid-solid separation of slurries at the exit from the digestion due to the very large increase in the filtration area that would be necessary and the corresponding large reduction in productivity.

U.S. Pat. No. 5,080,803 (ALCAN) describes devices capable of settling slurries injected under pressure. Even if this type of device provides a means of reducing the residence time during the liquid-solid separation phase, it is still a relatively long step which imposes large volumes to be treated (large industrial installations, settlement tanks with a diameter of several tens of meters, etc.) and that increases the risk of reversion. Reversion is a phenomenon that should be avoided since it results in premature precipitation of alumina trihydrate which mixes with insoluble residues and is discharged with these residues.

In order to reduce reversion risks due to long residence times, it is important to limit supersaturation of the aluminate liquor in dissolved alumina expressed by the ratio Rp $$R_p = \frac{\text{concentration of dissolved } Al_2O_3 \text{ (in g/l)}}{\text{concentration of caustic } Na_2O \text{ (in g/l)}}$$

and the productivity of the liquor that is proportional to this ratio is reduced.

Therefore, the applicant attempted to develop an industrial process to obtain a fast and efficient liquid-solid separation of the slurry at the exit from digestion.

SUMMARY OF THE INVENTION

The purpose of the invention is a method for the treatment of bauxite by alkaline digestion, typically using the Bayer process, capable of obtaining alumina hydrate and characterised in that ground bauxite is added directly into an alkaline solution that is drawn off and that will be reinserted into the Bayer aluminate liquor circuit, the said alkaline solution being heated to a temperature such that after the said ground bauxite and the said alkaline solution have been brought into contact, the temperature of the slurry resulting from this mix is greater than a temperature close to the boiling temperature at atmospheric pressure, in other words typically greater than 95° C. and preferably greater than or equal to the boiling temperature at atmospheric pressure.

The Applicant observed that filterability properties of mud following from alkaline digestion are very strongly degraded if ground bauxite is mixed in the said alkaline solution at ambient temperature and if the resulting slurry is kept at a temperature close to ambient temperature even during a very short period, typically limited to a few minutes. A significant improvement in the filterability is only observed when the temperature of the first contact between bauxite and the alkaline solution is more than about 60° C.-70° C., and in any case more than 95° C. and more particularly above the boiling point. This can result in an improvement by a factor of 100 (specific resistance divided by 100) when the mix temperature exceeds the boiling point of the alkaline solution.

The alkaline solution used in the invention is an alkaline solution that has been drawn off or that will be added back into the circuit of the aluminate liquor used in the Bayer process; it may be an aliquot of the green liquor (caustic content preferably between 120 and 180 g Na2O/l, typically 160 g Na2O/l), the said aliquot preferably not exceeding 25% and even better not exceeding 20% of the total flow, or an aliquot of a washer overflow (i.e. the aqueous flow output from washing insoluble residues of the alkaline digestion (red mud)), particularly the first washer overflow (caustic content preferably between 40 and 120 g of Na2O/l, and typically 80 g of Na2O/l).

The mix according to the invention may be made at the predesilication temperature, if the composition of the bauxite imposes a predesilication treatment (usually this will be the case for a bauxite with a low content of reactive silica (typically less than 2.5%). Predesilication is usually done at a temperature of between 80° C. and 200° C. For bauxites essentially containing gibbsite, the temperature at which the mix is made according to the invention is preferably between 95° C. and 108° C., which is a means of making a treatment at atmospheric pressure.

The temperature at which the mix according to the invention is made can also be the digestion temperature, namely a temperature of between 120° C. and 200° C., and preferably between 140 and 150° C. for bauxites containing trihydrates (bauxites with gibbsite or low temperature digestion of mixed bauxites) or a temperature of more than 200° C., typically between 220° C. and 260° C., for bauxites containing monohydrates (bauxites with boehmite or diaspore). High temperature digestion of mixed bauxites may be made after the low temperature digestion (for example see FR 2 712 275) and in this case the bauxite has already been brought into contact with the aluminate liquor. But in other cases it will be done before or at the same time as the low temperature attack (for example see FR 2 715 153) and in this case the solution proposed in this invention can also advantageously be applied.

If predesilication is done and if the temperature chosen for predesilication is greater than the boiling point of the liquor, this step (like the digestion) must be done in a digester and the ground bauxite must be added into the digester under pressure. Regardless of whether of not there is any predesilication, it is important that the slurry obtained by the injection of ground bauxite into the hot liquor is entrained directly to digestion without going through a cooling phase at a temperature of below 95° C.

The bauxite is preferably wet ground to facilitate its transfer to desilication or digestion installations. In this case, grinding is done in the presence of water or in the presence of an aliquot of the spent aluminate liquor to reduce the flows involved, but this should correspond to a proportion of between 4 and 15%, and preferably between 5 and 10% of the total flow of spent aluminate liquor. In this way, this low proportion of the spent aluminate liquor held for a very short time in contact with the ground bauxite before it is brought to its temperature, does not modify the global result observed in the context of this invention, namely a significant improvement in the filterability of mud when bauxite is brought directly into the presence of a solution at a temperature such that the temperature of the slurry after mixing is greater than 95° C.

In one preferred embodiment of the invention, the wet bauxite thus obtained is brought to the target temperature (predesilication or digestion), for example using steam extracted from pressure reduction devices when digestion is made under pressure, before being brought into tanks or digesters to be used for predesilication or digestion. It would also be possible to grind the bauxite under pressure and using a wet method, in other words in the presence of an aliquot of the spent aluminate liquor and at a temperature above the boiling point of the said liquor (at atmospheric pressure).

In cases requiring predesilication (bauxite with a low content of reactive silica), the ground bauxite is mixed with an aliquot either of the spent liquor, or the first washer overflow such that the solid content in the slurry obtained is between 200 and 1000 g/l. The duration and efficiency of the predesilication treatment depend on the temperature at which the mix thus obtained is kept, the solid content and the caustic concentration, and obviously the target threshold concentration of silica. This target concentration is usually chosen such that the ratio by weight (soluble silica/caustic Na2O) is close to 0.7%. It may typically vary between about ten minutes for a mix at 150° C. with liquor from the first washer liquor (caustic concentration of the order of 40 g Na2O/l) leading to a slurry with a solid content equal to 1000 g/l at about 8 hours for a mix at 100° C. with a green liquor aliquot (caustic concentration of the order of 160 g Na2O/l) so that a slurry with a solid content equal to 200 g/l is obtained.

Before digestion, the initial solid content in the slurry must typically be of the order of 200 g/l. Therefore, it is usually necessary to dilute the slurry output from the desilication treatment to reduce its solid content. If it is required to maintain the beneficial effect the mix temperature on the filterability, this dilution should also be made at a temperature of more than 95° C., and preferably at the predesilication temperature, or at an intermediate temperature between the predesilication temperature and the digestion temperature.

The digestion is made by passing the slurry in one or several tanks or digesters in series. The temperature of the slurry is increased to the required temperature and is held at this temperature for as long as necessary for almost all the trihydrate contained in the bauxite to be solubilised in the aluminate liquor. One particular embodiment consists of replacing the digestion tanks in series by a tubular reactor or a series of tubular reactors; it is thus possible to take local action on a slurry in which the temperature and the concentration of the various constituents dissolved in the alkaline solution are more uniform. The supersaturation profiles of the dissolved chemical compounds (particularly silica) are thus better controlled and the size of particles to be filtered is better controlled by causing precipitation at a particular location in the tubular reaction vessel.

Apart from the significant improvement in the filterability of the mud thus obtained, it is also found that the sedimentation rate of this mud is significantly improved.

Therefore, large volume insoluble residue settlement devices used in prior art can be replaced by filtration devices. If the digestion is made under pressure, the filter wall may advantageously be installed in the pressure reduction circuit so that the driving force generated by the pressure difference on each side of the filter wall can be used advantageously. But since large investments are necessary to replace existing installations with filters, the increase in the sedimentation rate enables the use of a smaller number of conventional settlement tanks or new smaller settlement tanks (atmospheric pressure or high pressure settlement tanks).

EXAMPLES

Tests Demonstrating the Improved Filterability

Figure 1:
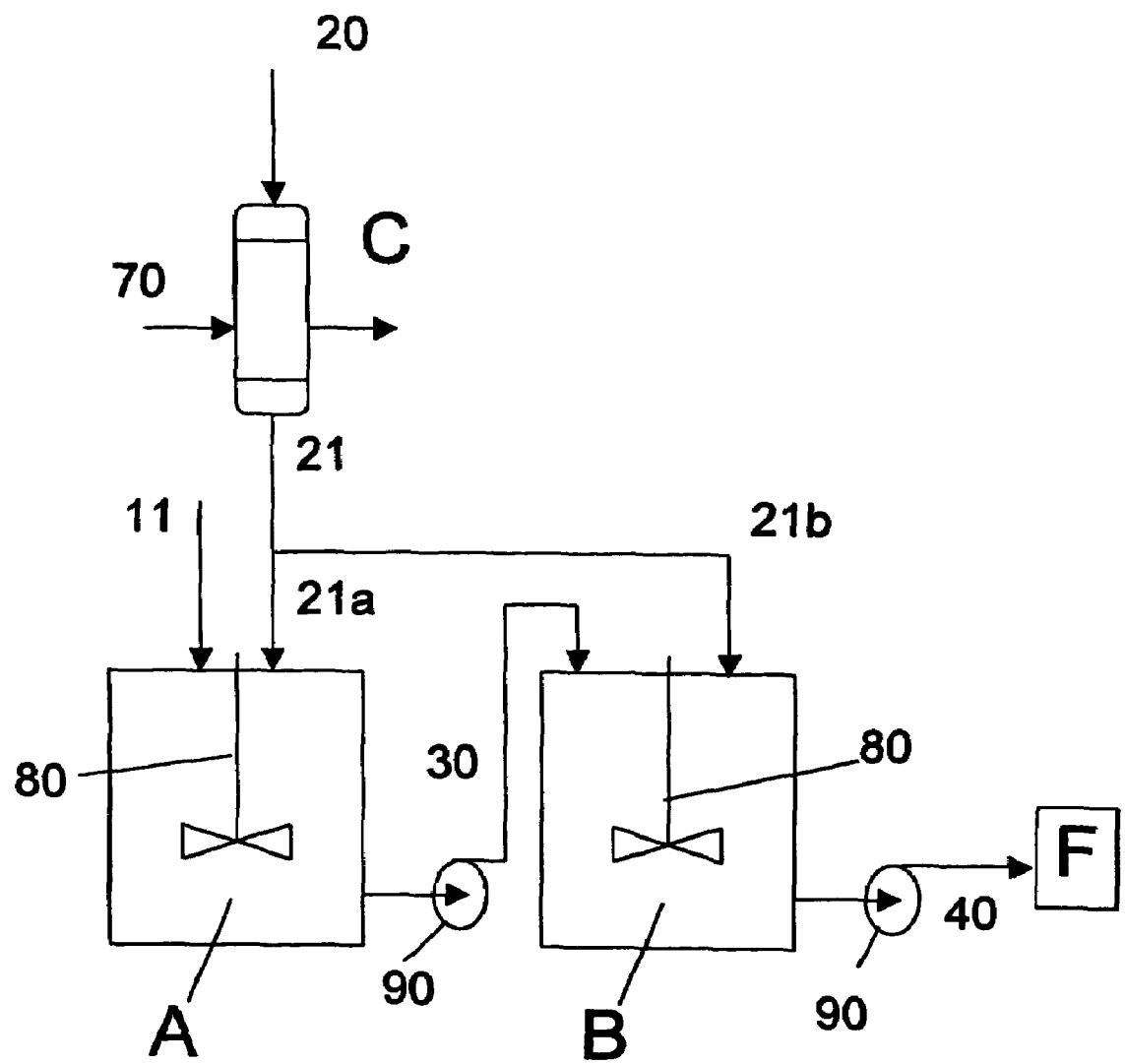
FIGS. 1-5 are schematic flow diagrams of variants of the invention.

The following examples are based on digestion on bauxite containing alumina trihydrate mainly in the form of gibbsite, at medium pressure. The first case uses an Indian bauxite containing essentially gibbsite. An African bauxite is used in the second case, comprising 86% of gibbsite and 14% of boehmite. In both cases, the digestion is made for about 10 minutes at a temperature of approximately 145° C. The slurry is then filtered by imposing a constant pressure difference equal to 4 bars on each side of the filter. The specific resistance α of the filtration cake is calculated using the following formula derived from the "Solid-liquid separation guide" (P. Rivet—French Filtration Society—IDEXPO 1981 Edition).

$$\alpha = \frac{2\Delta P \times \Omega_2}{\eta \times W \times V_2}\left(t - \frac{\eta \times R_s}{\Delta T \times \Omega}V\right)$$

where $\Delta P$ is the filtration pressure (in this case 4 bars or $4*10^5$ Pa)

t is the filtration time (s)

$\Omega$ is the filtering surface area expressed in $m^2$ $\eta$ is the dynamic viscosity of the filtrate expressed in Pa.s ($10^3$ centipoises)

V is the volume of the filtrate (in $m^3$) collected after time t expressed in seconds W is the mass of the dry cake deposited per unit volume of filtrate ($kg/m^3$)

Rs is the flow resistance of the filter support per unit area; it is determined by allowing the filtrate to flow through the support with area $\Omega$ at a flow q and measuring the pressure loss $\Delta P$ between the upstream and downstream sides of the filter support; it is then equal to $$\frac{\Delta P \times \Omega}{\eta \times q}$$

and is expressed in $m^{-1}$.

Example 1

An industrial sodium aluminate liquor with concentration 164 g/l of caustic Na2O and $R_p$=0.645 was added into a digester. This digester was heated to 150° C. Once the temperature was reached, a quantity of 300 g of hot Indian bauxite with trihydrate was added into 500 ml of liquor. Bauxite can be injected under pressure. For the purpose of this test (which uses low volumes), the ground bauxite is added into the digester at ambient temperature in a pod outside the reach of the liquor, the digester is closed and the assembly is heated. Once the temperature has been reached, the pod is tipped over such that the ground bauxite comes into contact with the liquor.

Predesilication is done holding the slurry thus obtained under pressure at 150° C. for 10 minutes.

The slurry is then diluted with 500 ml of the same aluminate liquor within the digester and the digestion is maintained for 10 minutes at the same temperature. This dilution and the dilution of alumina trihydrate resulting from the digestion lower the solid content from 600 g/l to 50 g/l.

The final slurry is then filtered to estimate the specific resistance of the filtered solid. The caustic concentration of the filtered liquor is 144 g Na2O/L and its supersaturation ratio Rp is equal to 1.33.

The filter used is a thermostat-controlled filter with a 90 mm PTFE (polytetrafluoroethylene) filtration membrane. The filtration tests are carried out using a frontal filtration method. The specific resistance calculated using the formula given above is equal to $1.2\,10^{11}$ m/kg on average. It is about 25 times less than the specific resistances of cakes obtained with the process according to prior art, that are of the order of $3\times10^{12}$ m/kg.

These excellent filterability results are accompanied by a mud extraction productivity at the exit from digestion greater than 1 $m^3/m^2/h$.

Example 2

An industrial sodium aluminate liquor with a concentration of 165 g/l of caustic Na2O and $R_p$=0.71 was added into a digester. This digester was heated to 150° C. Once this temperature was reached, a quantity of 300 g of mixed African bauxite was added hot into 500 ml of liquor.

Predesilication was done holding the slurry thus obtained under pressure for 10 minutes at 150° C.

The slurry was then diluted with 500 ml of the same aluminate liquor within the digester and the digestion was continued for 10 minutes at the same temperature. This dilution and the dissolution of alumina trihydrate resulting from digestion lower the solid content from 600 g/l to 50 g/l.

The final slurry is then filtered to estimate the specific resistance of the filtered solid. The filtered liquor has a caustic concentration of 157 g Na2O/l and a supersaturation ratio Rp equal to 1.065. The Rp reached is lower than in example 1 since boehmite is not dissolved and its presence encourages reversion.

The specific resistance calculated according to the formula described above is equal to $8\times10^{10}$ m/kg on average. It is about 40 times lower than the specific resistances of cakes obtained with the process according to prior art.

EMBODIMENTS OF THE INVENTION

FIGS. 1 to 5 present different variants of the process according to the invention, always envisaged in the context of a medium pressure digestion at a temperature equal to approximately 145° C. preceded by desilication at 140° C.

FIG. 1 shows a first embodiment in which the ground bauxite 11 and an aliquot 21*a* of the spent liquor 20—that has been heated and pressurized (C)—are added into a first autoclave A provided with stirring means 80. The spent liquor (green liquor) 20 is heated using steam 70 from pressure reduction tanks. Obviously, if the desilication and digestion temperatures are significantly different, the heating means C can be doubled up firstly to heat the aliquot 21*a* to the desilication temperature, and secondly the aliquot 21*b* to the digestion temperature.

The slurry resulting from the mix made in autoclave A is subjected to a predesilication treatment by maintaining stirring for one hour in autoclave A. The solid content in the slurry in autoclave A is between 200 and 1000 g/l.

The slurry 30 is then extracted using pumping means 90 and is then brought to the digester B where it is injected with the rest of the spent liquor 21b heated to the digestion temperature. After a given holding time in the digester, the slurry 40 is entrained to the liquid/solid separation device F. This device is preferably a filtration device that is placed in part of the circuit that is not yet under atmospheric pressure, such that a pressure difference equal to at least 4 bars can be obtained on each side of the membrane. Consequently, this avoids cooling of the liquor and reduces the risk of reversion due to cooling. The use of automatically removable filters is envisaged to eliminate the filtration cake as quickly as possible.

In FIG. 1, bauxite is ground dry and is then injected into the autoclave A under pressure. The autoclave in FIG. 2 is different from the previous autoclave in that with such a device it is possible to use wet grinding that is more frequently used, and better known high pressure slurry injection technologies; the bauxite 10 and water 50 are poured into a grinder D, the slurry 15 resulting from this wet grinding is pumped and injected under pressure into autoclave A.

However, the addition of water in example 2 reduces the caustic concentration, which is undoubtedly favourable to desilicatation, but makes it necessary to increase the concentration of the caustic content of the aliquot 21b so as to compensate for the dilution of 21a and finally obtain a green liquor with the required caustic concentration (about 170 g of Na2O/l). Therefore, an additional evaporation device (not illustrated in FIG. 2) is necessary on the aliquot circuit 21b, so that the required caustic overconcentration can be achieved.

Figure 3:
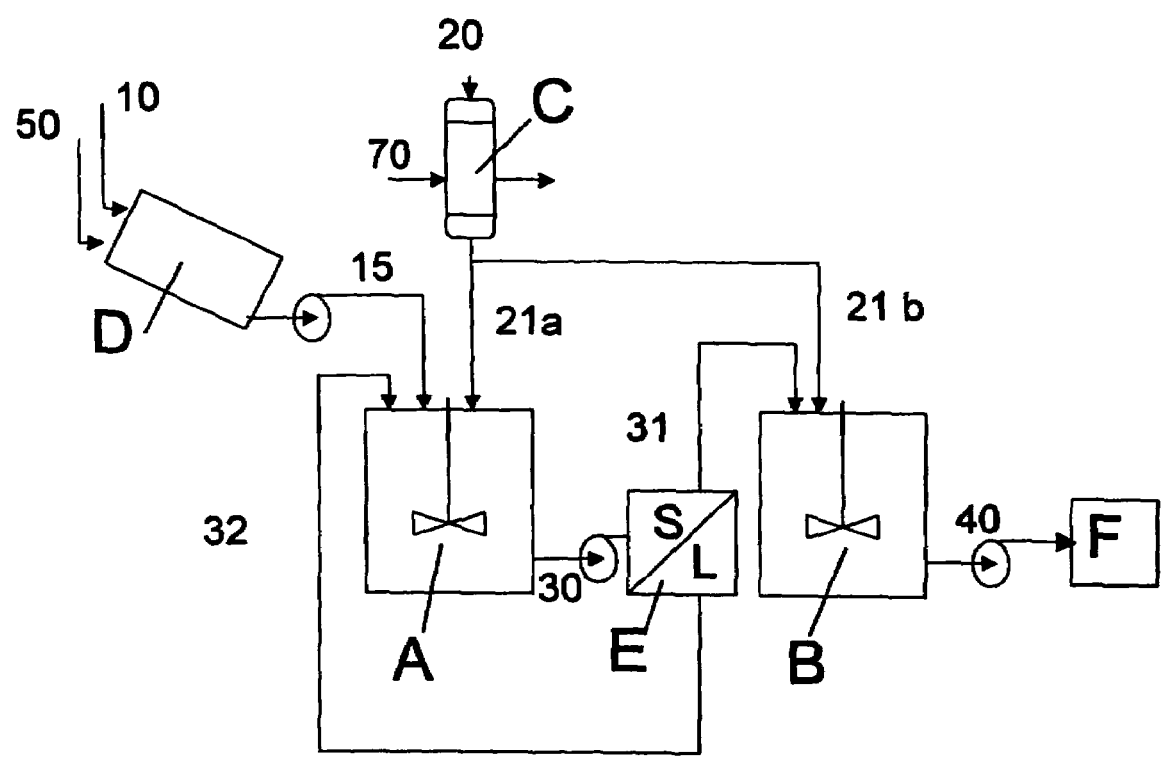

The circuit in FIG. 3 provides a means of solving the previous problem at lower cost. The slurry 30 is extracted using pumping means, and is then brought to a liquid solid separation device (filter or high pressure settlement tank). The filtrate is added back into desilication autoclave A and the solid is transferred and is then injected into the digestion autoclave B.

Figure 2:
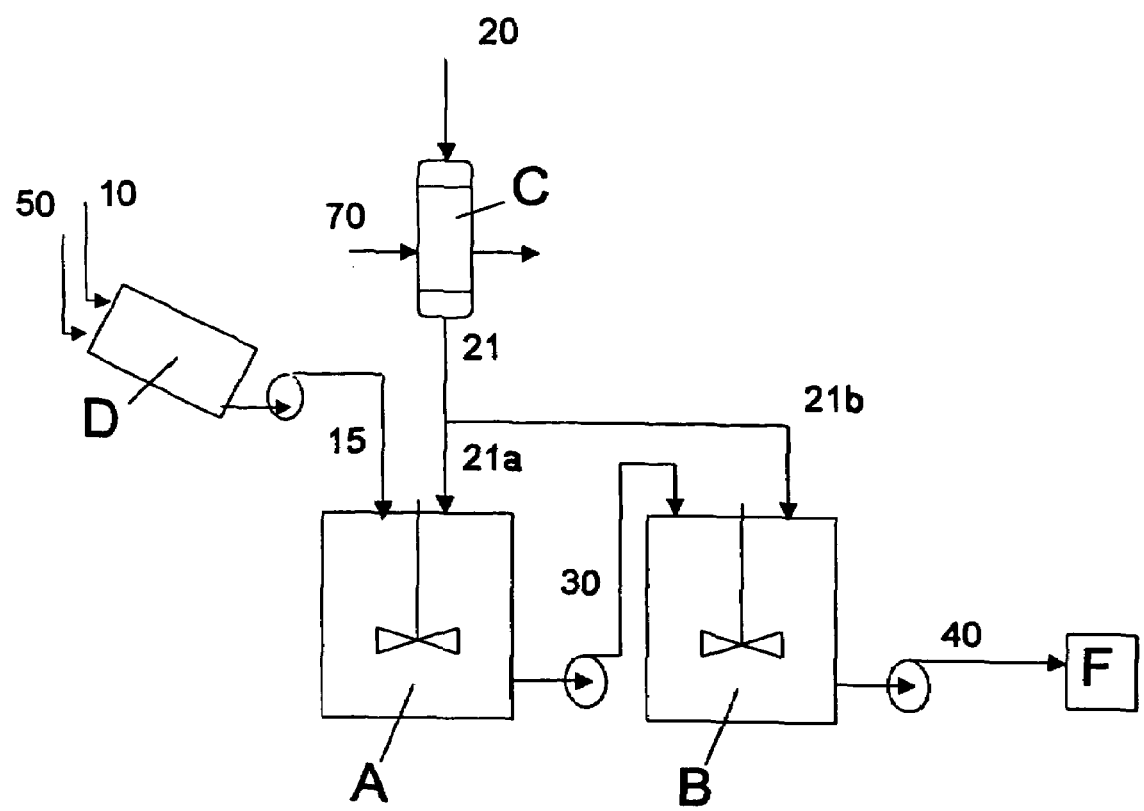
Figure 4:
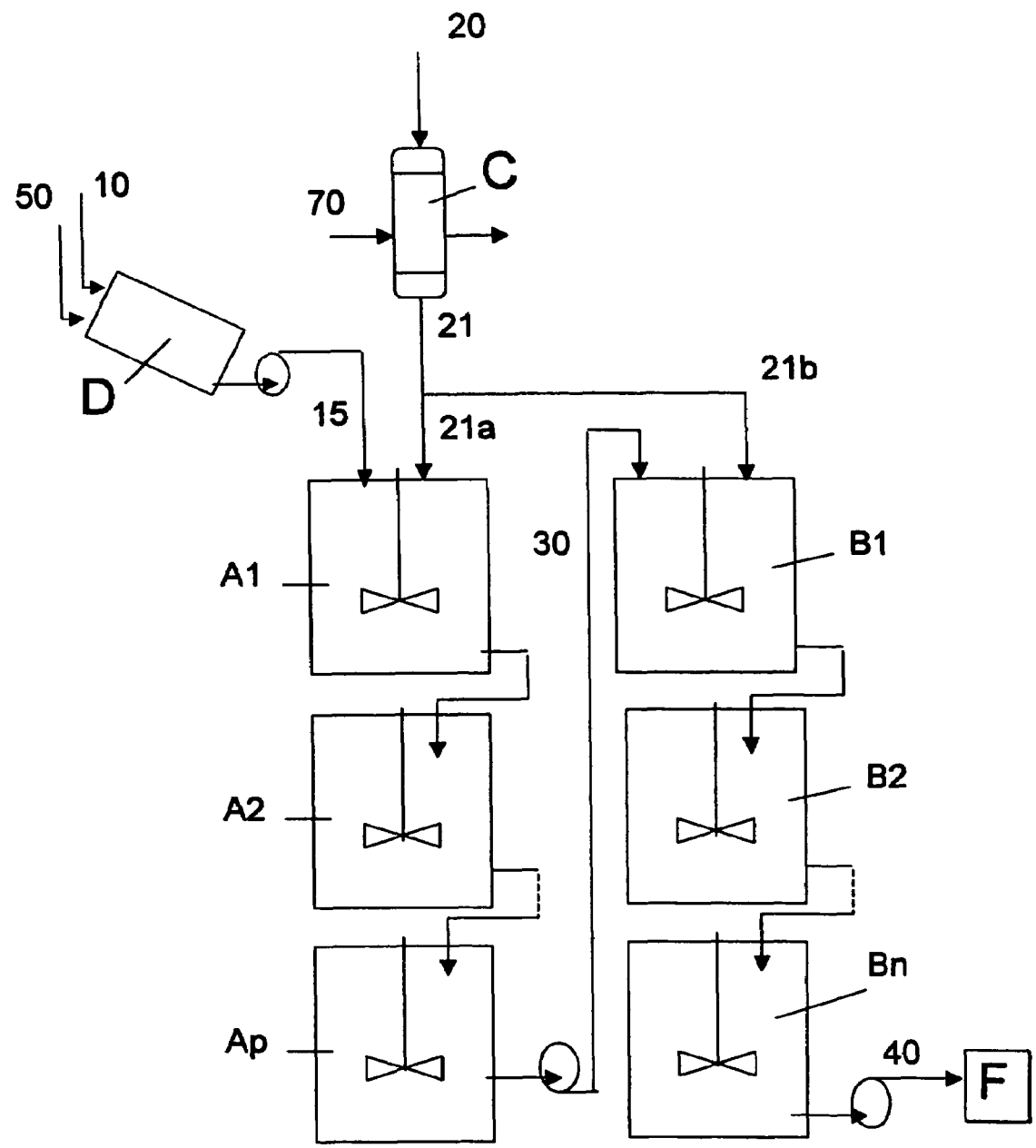

FIG. 4 illustrates a variant of the process illustrated in FIG. 2; the desilication autoclave A is replaced by a series of p autoclaves A1, A2, . . . , Ap, and the particles in suspension circulate in an environment with a more uniform temperature in each of these autoclaves; it is then easier to control the precipitation of silica and the size grading of the precipitates obtained. The chances of obtaining a slurry with good filterability properties on the downstream side increase as the size of these precipitates increases.

The digester B is also replaced by a series of digestion autoclaves B1, B2, . . . Bn. Several autoclaves are frequently necessary when fairly high digestion temperatures are required (more than 200° C.).

Figure 5:
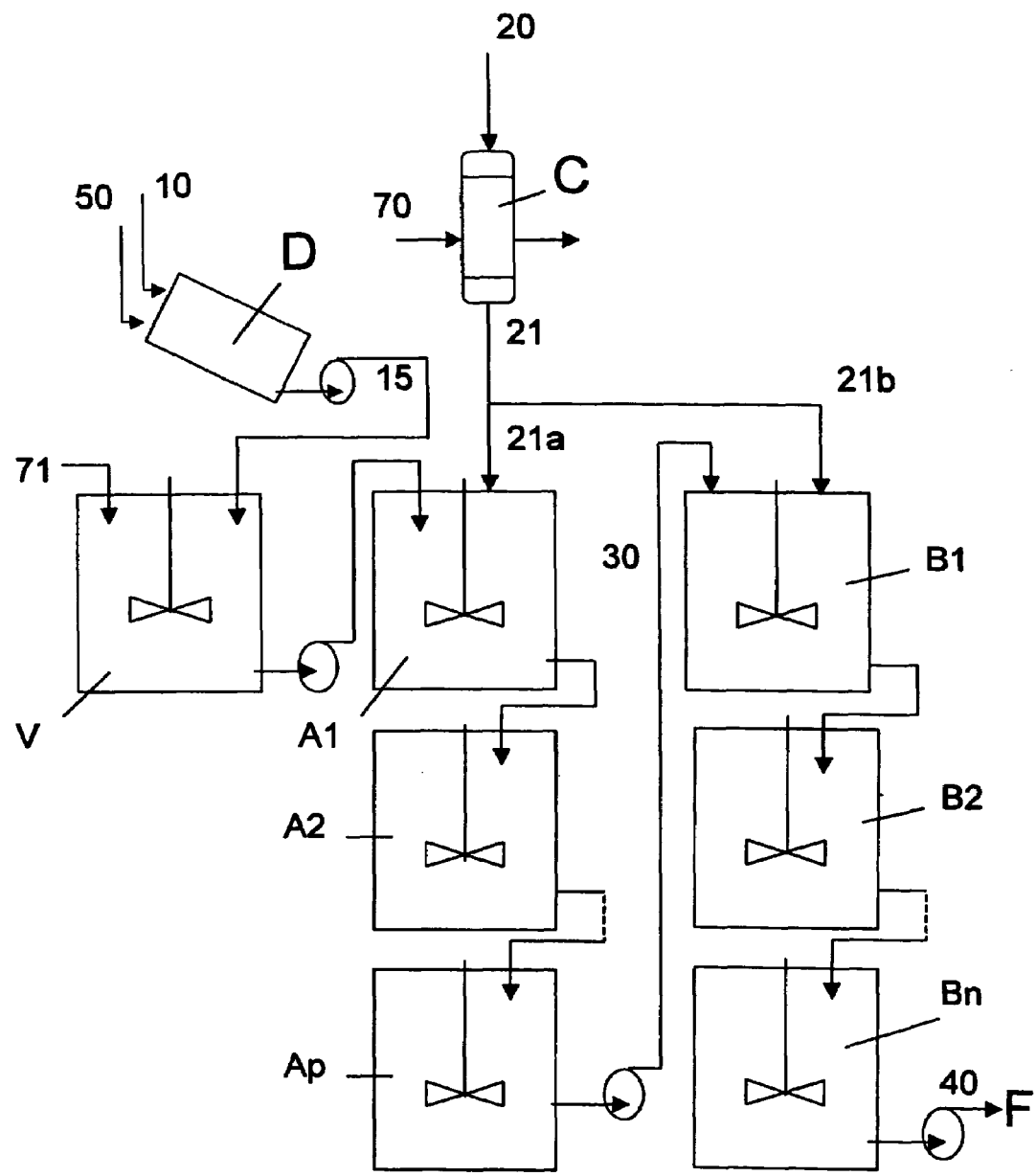

FIG. 5 illustrates a process similar to the process in FIG. 4 in which wet ground bauxite passes firstly through an autoclave V in which its temperature is increased to the temperature of the first desilication autoclave using steam 71. This steam may originate from the pressure reduction circuit or from a cooling device provided to cool the aliquot 21a, if the desilication temperature and the digestion temperature are not the same.

Obviously, all or some of these additional means illustrated in FIGS. 2 to 5 can be combined.

One particular embodiment consists of replacing tanks or digesters in series by a tubular reaction vessel or a series of tubular reaction vessels; it is then possible to take local action on a slurry with a more uniform temperature, which contains an alkaline solution with a more uniform concentration of its various dissolved constituents.

Thus, the supersaturation profiles of dissolved compounds, and particularly of silica, can be better controlled, and the size of precipitates that then have to be retained by filtration can be better controlled by causing precipitation at a specific location in the tubular reaction vessel.

Temperature profiles and thermal balances during desilication or the digestion can be optimised by putting autoclaves in series, with the slurry then passing through the autoclaves and the autoclaves being heated by steam output from the pressure reducers fitted in each reaction vessel (see FIG. 1 in French application No. 02 00717 deposited on Jan. 1, 2002). The pressure on the final slurry obtained at the end of the digestion in each pressure reducer is reduced releasing heat, and the steam output from the pressure reducer is used to heat the corresponding reaction vessel.

Tubular exchangers with three coaxial cylindrical walls could also be considered, in which the final slurry circulates on one side of the intermediate wall, and the other side of the wall is in contact with the liquor or the slurry to be heated and circulating in the opposite direction to the final slurry.

Advantages

For equal production, replacement of settlement tanks by smaller (and therefore less expensive) installations, and reduction of flows to be managed.

Much lower risk of reversion, which makes it possible to increase supersaturation of the liquor after digestion and therefore increases productivity during decomposition (or for equal productivity, reduces the caustic concentration of the liquor).

The invention claimed is:

1. In a Bayer process for the treatment of bauxite by alkaline digestion, said Bayer process treatment comprising the steps of treating bauxite ore with a hot, aqueous solution containing sodium hydroxide to obtain a supersaturated solution of sodium aluminate, separating undigested ore residue from the supersaturated solution, seeding the supersaturated sodium aluminate solution after said separation with particles of alumina trihydrate to cause precipitation of alumina trihydrate, and to obtain a depleted sodium aluminate solution designated spent liquor, and recycling the spent liquor to the step of treating bauxite ore,
   the improvement comprising removing an aliquot of the spent liquor, heating the aliquot of spent liquor, mixing the heated aliquot of spent liquor with ground bauxite to form a slurry, and returning the slurry to the treating step,
   wherein the heating step comprises heating the aliquot of spent liquor to a temperature sufficient that first contact between the ground bauxite and the spent liquor occurs at a temperature of greater than about 95° C., and that after said mixing step, the slurry is at a temperature greater than about 95° C.

2. Process according to claim 1, wherein the heating step is sufficient that after said mixing step, the slurry is at a temperature at least about boiling temperature at atmospheric pressure.

3. Process according to claim 1, additionally comprising grinding the bauxite in the presence of an aliquot representing less than 15% of the liquor.

4. Process according to claim 1, wherein the ground bauxite is heated before mixing to a temperature of about the temperature to which the said aliquot of spent liquor is heated.

5. Process according to claim 1, additionally comprising wet grinding the bauxite at a temperature greater than 95° C.

6. Process according to claim 1, wherein the aliquot of spent liquor is an amount not exceeding 25% of total liquor flow.

7. Process according to claim 1, wherein the aliquot is obtained from washer overflow, an aqueous flow output from washing of the undigested ore residue.

8. Process according to claim 1, wherein the slurry is subjected to a predesilication treatment in a desilication autoclave, followed by a liquid/solid separation, the liquid being returned to the desilication autoclave and the solid being injected into a digester autoclave.

* * * * *

UNITED STATES PATENT AND TRADEMARK OFFICE
CERTIFICATE OF CORRECTION

PATENT NO. : 7,658,896 B2  Page 1 of 1
APPLICATION NO. : 10/530352
DATED : February 9, 2010
INVENTOR(S) : Nicolas Mugnier et al.

It is certified that error appears in the above-identified patent and that said Letters Patent is hereby corrected as shown below:

On the Title Page, please correct the Assignee information as follows:

Item (73) Assignee: Pechiney Rhenalu to --Assignee: Aluminium Pechiney--.

Signed and Sealed this

Fourth Day of May, 2010

David J. Kappos
*Director of the United States Patent and Trademark Office*